United States Patent [19]

Kurosawa et al.

[11] 4,255,113

[45] Mar. 10, 1981

[54] FLUID-OPERATED PRESS

[75] Inventors: Takuzo Kurosawa; Seiki Dewa; Yuzuru Kikuchi, all of Hitachi; Hisanobu Kanamaru, Katsuta, all of Japan

[73] Assignee: Hitachi, Ltd., Japan

[21] Appl. No.: 118,741

[22] Filed: Feb. 5, 1980

[51] Int. Cl.³ .......................... B29C 3/00; B30B 1/00

[52] U.S. Cl. .................................. 425/411; 425/406; 425/589; 425/590; 425/450.1

[58] Field of Search ............... 425/406, 410, 411, 589, 425/590, 591, DIG. 223, 451.9, 451.6, 78, 450.1, 451.2, 592, 593, 451.3, 451.4

[56] References Cited

U.S. PATENT DOCUMENTS 3,093,863 6/1963 Ehlert .............................. 425/590 X
3,104,433 9/1963 Hoern .............................. 425/590 X

*Primary Examiner*—J. Howard Flint, Jr.
*Attorney, Agent, or Firm*—Craig and Antonelli

[57] ABSTRACT

A fluid-operated press comprises a crosshead, a bead, four upstanding posts each extending vertically between each corner portion of the crosshead and each corner portion of the bead, and a slider disposed between the crosshead and the bead and slidably fitted on the posts to be slidable along the latter. An upright wall structure located outside the slider and the posts is clamped between the crosshead and the bead to enhance rigidity of the frame structure of the press. The upright wall structure has a wall portion surrounding at least that portion of the peripheral surface of each post which, as viewed in cross-section of the press through the upright wall structure, is positioned between two lines obtained by extending two adjacent sides of a rectangle which is formed by connecting the center points of the four posts.

9 Claims, 19 Drawing Figures

FLUID-OPERATED PRESS

1 BACKGROUND OF THE INVENTION

1. Field of the Invention

The present invention relates to a fluid-operated press and, more particularly, to a fluid-operated press having a frame structure for a precision work and being suitable specifically for a plastic working.

2. Description of the Prior Arts

Such a fluid-operated press has been known as having a crosshead, a bed, four upstanding posts extending between the crosshead and the bed, and a slider disposed between the crosshead and the bed and slidably fitted on the upstanding posts so as to slide along the posts, wherein the upstanding posts are of such a rectangular arrangement that the axes of the posts extend vertically through respective corners of a rectangular plane. The fluid-operated press of this type in which the upstanding posts serve as members for guiding the sliding movement of the slider has an advantage that a stable and smooth guide for the sliding movement of the slider can be effected with a comparatively simple construction. The frame structure of this type of press, however, has a small lateral rigidity, so that undesirable distortion or displacement of the slider, such as inclination or skew of the slider with respect to the plane of surface of the bed, is caused during the operation of the press. For this reason, it has been impossible to maintain with high precision a preferable positional relationship between the slider and the bed.

A typical example of known fluid-operated press improved to provide a high rigidity and hence to maintain with high precision the preferable positional relationship between the slider and the bed includes an upright wall structure having box-like upright walls completely surrounding the entire periphery of each upstanding post. Unfortunately, however, this improved fluid-operated press cannot easily effects a smooth and stable guide for the sliding movement of the slider, and hence a complicated and expensive construction is required for maintaining with high precision the preferable positional relationship between the slider and the bed.

SUMMARY OF THE INVENTION

It is, therefore, a primary object of the invention to provide a fluid-operated press having a simplified construction and, nevertheless, having a high rigidity of the frame structure to maintain with high precision the preferable positional relationship between the slider and the bed.

It is another object of the invention to provide a fluid-operated press capable of performing a smooth and stable guide for the sliding movement of the slider without being accompanied by disadvantages such as increment of dead space between the crosshead and the bed. p To these ends, according to the invention, there is provided a fluid-operated press comprising a crosshead, a bed, four upstanding posts extending between the crosshead and the bed, the upstanding posts being of rectangular arrangement with the axis of each post extending vertically through each corner portion of a rectangular plane, a slider disposed between the crosshead and the bed and slidably fitted on the posts to be slidable along the latter, and upright wall means positioned outside the slider and the posts and clamped between the crosshead and the bed, the upright wall means including a wall portion surrounding at least that portion of the peripheral surface of each post which, as viewed in cross-section of the press through any vertical position of the upright wall means, is positioned between two lines obtained by extending two adjacent sides of a rectangle which is formed by connecting the center points of the posts.

The above and other objects, features and advantages of the invention will become more apparent from the following description of the preferred embodiments taken in conjunction with the accompanying drawings.

BRIEF DESCRIPTION OF THE DRAWINGS

Same or similar numerals designate same or similar parts throughout the Figures.

DESCRIPTION OF THE PREFERRED EMBODIMENTS

Before entering into detailed description of the preferred embodiments of the present invention, fluid-operated presses of prior art structures will be described to facilitate the understanding of the present invention.

Figure 1A:
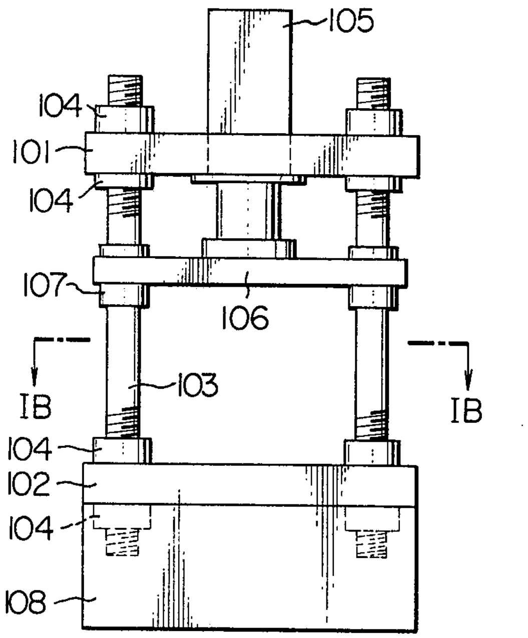
FIG. 1A PRIOR ART
FIG. 1A is a schematic front elevational view of a conventional fluid-operated press having four upstanding posts and a slider slidable along the posts.
Figure 1B:
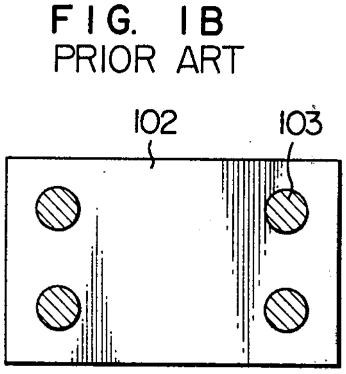
FIG. 1B PRIOR ART
FIG. 1B is a sectional view taken along the line IB—IB of FIG. 1.

FIGS. 1A and 1B show a prior art fluid-operated press having a crosshead 101, bed 102 and four upstanding posts 103. In this prior art press, the crosshead 101 and the bed 102 are secured by means of nuts 104 to the upstanding posts 103 disposed at respective corners of a rectangle. Slide bushes 107 attached to a slider 106 are slidably fitted on the posts 103 so that the slider 106 is slidingly moved along the posts 103 as a fluid-operated cylinder 105 is operated. A reference numeral 108 denotes a base.

In this type of prior art press, the sliding movement of the slider 106 along the posts 103 is effected through a sliding contact between the inner peripheral surface of each slide bush 107 and the outer peripheral surface of the cooperating post 103.

With this structure in which the sliding surfaces are constituted by mutually fitting cylindrical surfaces, it is possible to obtain a large area of the sliding surfaces. Thus, the tendency to cause undesirable displacement or distortion of the slider 106 with respect to the bed 102 (e.g. inclination, skew and so forth of the slider) during the sliding of the slider 106 can be suppressed, so that the sliding motion may be made smooth and precise. In addition, since a sufficiently large area of sliding surface is obtainable even with a reduced axial length of each slide bush 107, the dead space between the crosshead 101 and the bed 102 can be advantageously diminished.

This prior art fluid-operated press, however, is small in lateral rigidity of the frame structure, so that the undesirable distortion or displacement of the slider such as inclination or skew of the slider with respect to the plane of the bed tends to be caused during the press work. Thus, it has been difficult to maintain with high precision the perferable positional relationship between the slider 106 and the bed 102. It is to be noted that the term "lateral rigidity" is used herein to indicate the rigidity represented by the amount $\delta$ of the lateral deflection of the top portion of the crosshead 101 as observed when the maximum press load is exerted on a point p which is offset by a distance l from the center O of the press. This rigidity not only indicates the rigidity against an eccentric load but also can be used as an index for the ability of preserving the dimensional precision against lateral vibration and the like external force.

The prior art fluid-operated press shown in FIGS. 1A and 1B has small lateral rigidity and, hence, cannot maintain the required precision of the positional relationship between the bed and the slider. This causes various troubles such as biting between the slide bushes 107 and the posts 103, and damage of the mold parts.

Figure 3A:
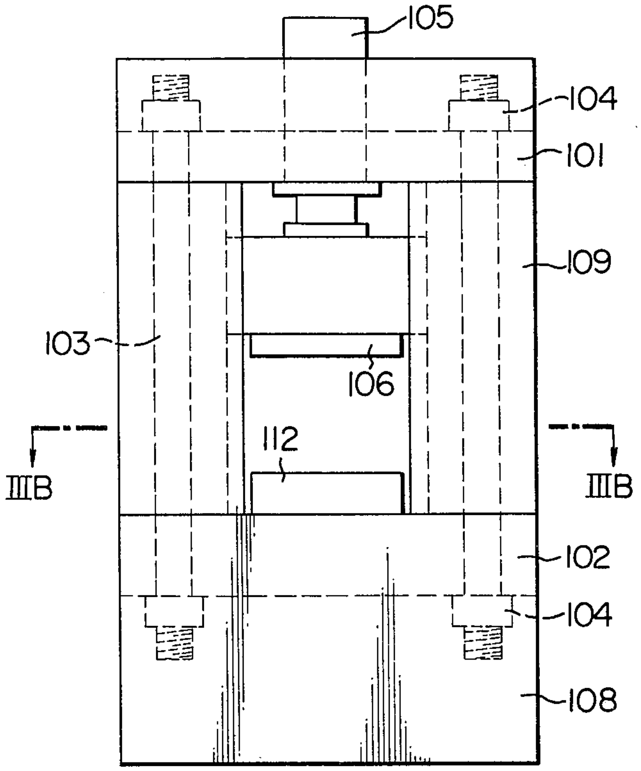
FIG. 3A PRIOR ART
FIG. 3A is a schematic front elevational view of a conventional fluid-operated press having box-like upright walls completely surrounding each upstanding post.
Figure 3B:
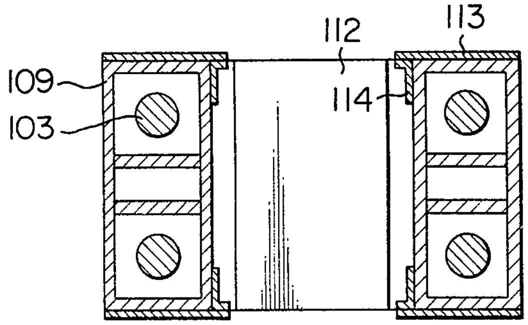
FIG. 3B PRIOR ART
FIG. 3B is a sectional view taken along the line IIIB—IIIB of FIG. 3A.

FIGS. 3A and 3B show another prior art fluid-operated press which is suitably used when a specifically high operational precision is required. This fluid-operated press has a frame structure including box-like upright walls 109 disposed between the crosshead 101 and the bed 102 and completely surrounding the entire peripheries of the respective posts 103. The upright walls 109 are secured in position with a cooperation of the upstanding posts 103 and associated nuts 104. The slider 106 slides up and down through the operation of a fluid-operated cylinder 105 along slide guides 114 which are fixed to guide holders 113 which in turn are secured to the front and rear sides of the upright walls 109. Reference numerals 108 and 112 designate a base and a bolster.

In this fluid-operated press, the upright walls 109 are clamped between the crosshead 101 and the bed 102. The crosshead 101 and the bed 102 are brought together by a cooperation of the posts 103 and nuts 104 which in turn acts to tighten or compress the upright walls 109. The tightening force is the sum of the tightening force exerted by each of the four posts and is usually 1.5 times as large as the press force. Therefore, the deflections of the crosshead 101 and the bed 102 in the vertical direction during the press work is advantageously diminished and the lateral rigidity of the press is improved considerably. In addition, since the upright walls 109 have box-like form completely surrounding the entire peripheries of the respective posts 103, no substantial deflection of the crosshead 101 and the bed 102 is caused at the time of tightening by the nuts 104. For these reasons, the prior art fluid-operated press shown in FIGS. 3A and 3B has been used for such press works requiring a specifically high dimensional precision.

This type of prior art fluid-operated press, however, has a very complicated construction and is expensive because the number of parts is large and because the precision requirement for each part is strict. It is also to be pointed out that the sliding surfaces between the slider 106 and the slide guide 114 are not cylindrical, in contrast to the case of the fluid-operated press shown in FIGS. 1A and 1B. It is, therefore, necessary to increase the thickness of the slider 106, i.e. the vertical length of the same as viewed in FIG. 3A, in order to maintain the parallelness of the slider 106 to the bed 102 by increasing the area of the sliding surfaces, which inconveniently increases the dead space between the crosshead 101 and the bed 102. In addition, since the slide guides 114 are required to make uniform sliding contact with the sliding surfaces of the slider over the entire stroke of the latter, it is necessary to finish the slide guides precisely by a manual work. Even with this manual finishing work, it is still difficult to obtain a high precision of the positional relationship between the slider 106 and the bed 102.

Thus, it has been impossible to maintain a high precision of the positional relationship between the slider and the bed during operation of the prior art fluid-operated presses. To overcome this problem, in these prior art fluid-operated presses, the mold parts or dies 115, 116 are attached to the slider 106 and the bed 102 in a manner shown in FIG. 4. Namely, a die set constituted by an upper holder 119 and a lower holder 120 is prepared. The upper holder 119 has guide bushes 117, while the lower holder 120 is provided with guide pins 118 for cooperating with the guide bushes 117. The upper and the lower holders 119 and 120 are then attached to the slider 106 and the bed 102, respectively, by the cooperation of die set clamps 122 and T-shaped grooves 121. Then, the dies 115, 116 are attached to the upper and lower holders by means of die clamps 123. Thus, the mutual alignment of the dies 115, 116 is achieved by a cooperation of the guide bush 117 and the guide pin 118, so that a high precision of the positional relationship is achieved between the slider and the bed. The use of the die set, however, inconveniently narrows the working entrance to deteriorate the efficiency of the work. In addition, the cost of the product is raised due to the use of the expensive die set.

These drawbacks or problems of the prior art are fairly eliminated or overcome by the present invention, as will be fully realized from the following description of the preferred embodiments of the invention.

Figure 5A:
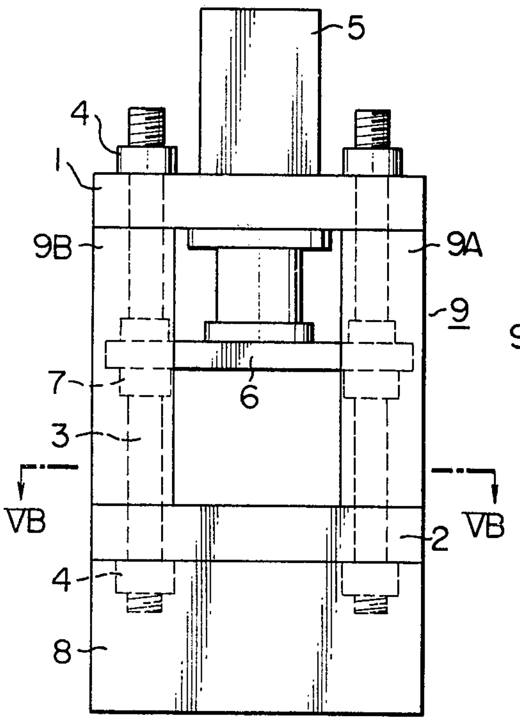
FIG. 5A is a schematic front elevational view of a fluid-operated press constructed in accordance with a first embodiment of the invention.
Figure 5B:
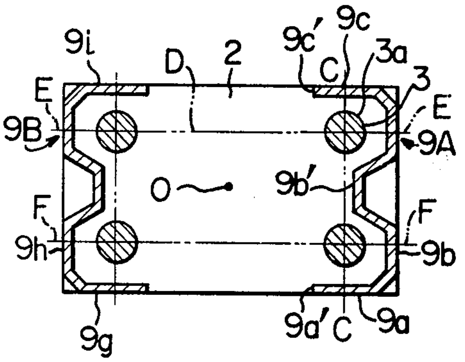
FIG. 5B is a sectional view taken along the line VB—VB of FIG. 5A.

Referring now to FIGS. 5A and 5B showing a fluid-operated press constructed in accordance with a first embodiment of the invention, a frame structure includes an upright wall structure 9 clamped between a crosshead 1 and a bed 2 which are assembled together by the cooperation of four upstanding posts 3 and nuts 4 so as to tighten or compress the upright wall structure. The tightening force exerted on the upright wall structure is usually the sum of the tightening forces exerted by four posts through screwing of the nuts and is about 1.5 times as large as the press force.

As will be seen from FIG. 5B, each upstanding post 3 is positioned at corresponding corner of the press. The four posts 3 are of rectangular arrangement with the axis of each post extending vertically through each corner of a rectangle D. The slider 6 is mounted between the crosshead 1 and the bed 2 to be slidable along the upstanding posts 3. More specifically, slide bushes 7 attached to the slider 6 slidably fit on the corresponding upstanding posts 3, and each slide bush makes a sliding contact at its inner peripheral surface with the outer peripheral surface of the corresponding upstanding post.

As will be clearly understood from FIG. 5B, the upright wall structure 9 includes upright walls 9A and 9B. More specifically, one 9A of the upright walls surrounds that portions of the peripheral surfaces of two posts 3 positioned on the right as viewed in FIG. 5B which face the outside of the press, and has a front wall portion 9*a*, side wall portion 9*b* and a rear wall portion 9*c*. The ends 9*a*' and 9*c*' of the front and rear wall portions 9*a*, 9*c* are offset toward the inside of the press (toward the left as viewed in FIG. 5B) from a line C—C which interconnects the axes of two posts 3 located on the right as viewed in FIG. 5B. The side wall portion 9*b* covers the right side surfaces of the two posts, and has an inwardly projected portion 9*b*' at a position between these two posts. This inwardly projected portion 9*b*' serves to increase the rigidity of the upright wall 9A. In FIG. 5A, reference numeral 5 denotes a fluid-operated cylinder for causing the sliding movement of the slider 6, and a reference numeral 8 denotes a base.

The upright wall 9B located on the left in FIGS. 5A and 5B is configurated and positioned in symmetry with the right upright wal 9A with respect to the center O of the press. Namely, the upright wall 9B has, as in the case of the upright wall 9A, a front wall portion 9*g*, side wall portion 9*h* and a rear wall portion 9*i*.

With the provision of the upright wall structure 9, the fluid-operated press of the first embodiment can exhibit a high lateral rigidity which compares with that of the prior art frame structure as shown in FIGS. 3A and 3B. Thus, in the fluid-operated press of the first embodiment, rigidity and the ability to preserve or maintain the precision are simultaneously improved.

Figure 2:
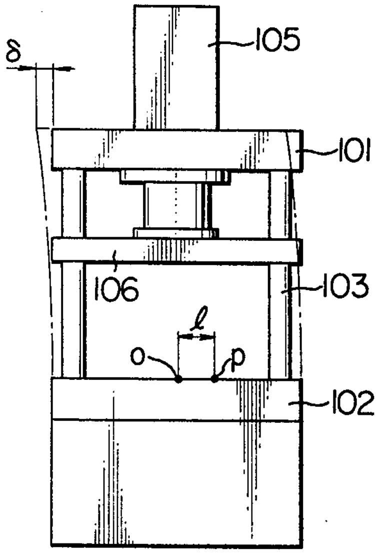
FIG. 2 PRIOR ART
FIG. 2 is a schematic front elevational view for explaining the lateral rigidity of the press.
Figure 6A:
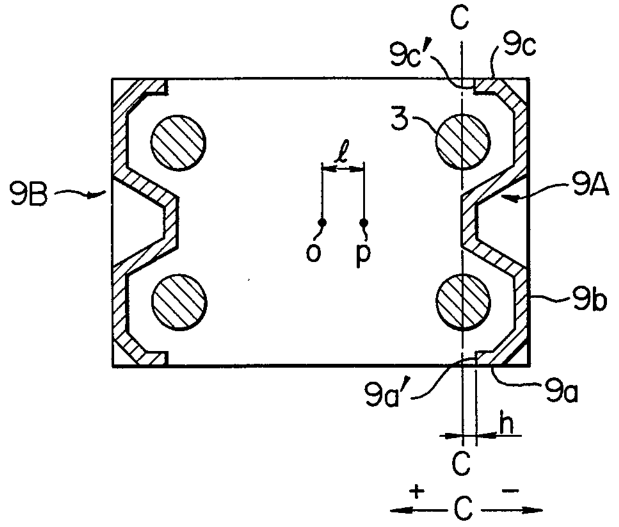
FIGS. 6A and 6B are an illustration and a diagram, respectively, showing the relationship between the shape of the upright wall structure and deflection caused by eccentric load imposed on the fluid-operated press embodying the invention.
Figure 6B:
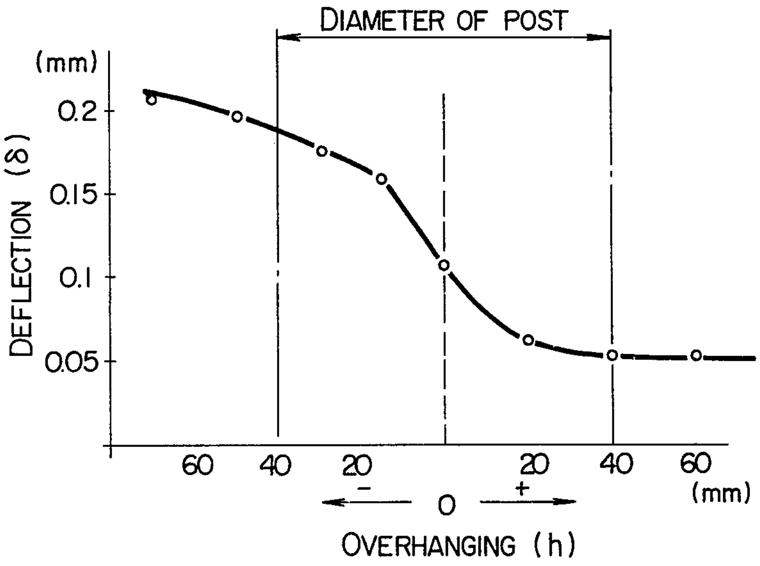

FIGS. 6A, 6B and FIGS. 7A, 7B show the result of tests conducted by the inventors. Referring first to FIGS. 6A, 6B, there is shown a relationship between the lateral deflection δ which was previously explained in connection with FIG. 2 and the length of the front and rear wall portions of the upright wall structure in the first embodiment. The test was conducted to ascertain how the deflection δ (mm) is affected by the distance h (mm) between the ends 9*a*, 9*c*' of the front and rear wall portions 9*a*, 9*c* of the upright wall 9A and the line C—C interconnecting the centers of two posts adjacent to these posts. The distance h will be referred to as "overhanging" for the convenience's sake. The overhanging is represented as being minus (−) and plus (+), respectively, when the ends 9*a*', 9*c*' are located at the outside and inside, respectively, of the line C—C. The dimensions of the tested fluid-operated press and the testing condition were as follows.

diameter of each post: 80 mm
distance between the axes of the posts: 600×400 mm
distance between inner surface of upright wall and the associated posts: 70 mm
thickness of upright walls: 20 mm
offset from center of press (l): 150 mm
eccentric load applied to above offset point (p): 100 tons From the test result shown in FIG. 6B, it will be understood that the deflection δ is significantly decreased as the overhanging h is increased to the plus (+) side beyond zero point. Particularly, a remarkable decrease of the deflection δ is achieved and hence the lateral rigidity of the press is considerably increased as the overhanging h is increased to such a level that the front and rear wall portions 9*a*, 9*c* completely overhang and cover the corresponding posts at the front and rear sides of the press, i.e. as the overhanging in FIG. 6B is increased to 40 mm.

Figure 7A:
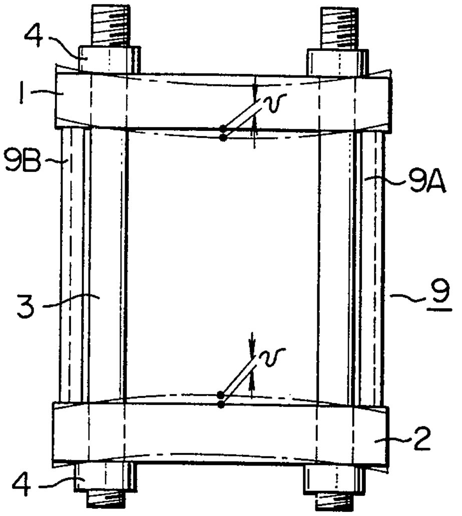
FIGS. 7A and 7B are an illustration and a diagram, respectively, showing the relationship between the shape of the upright wall structure and the deflection at centers of the crosshead and the bed.
Figure 7B:
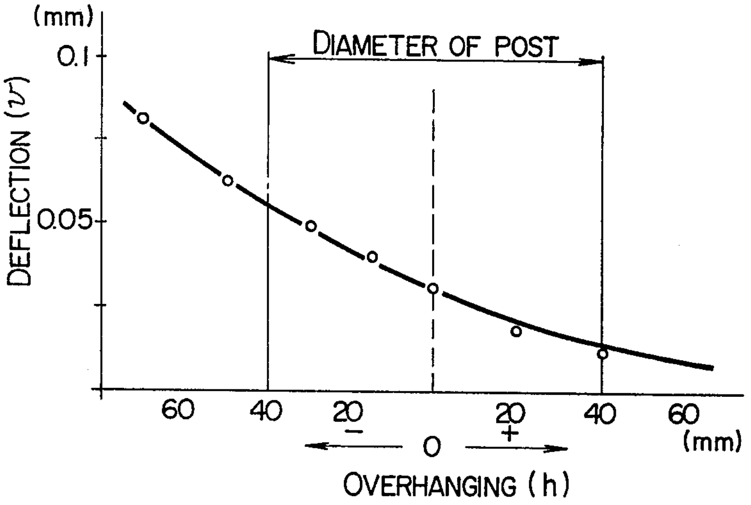

FIG. 7B shows the deflection v of the crosshead 1 and the bed 2 at the center of the press as observed when the upright wall structure 9 clamped between the crosshead 1 and the bed 2 is tightened by means of the nuts 4 associated with the posts, in relation to the aforementioned overhanging h. The deflection v and the overhanging h are represented in millimeters. The length, breadth and thickness of the bed used in the test were 780 mm, 580 mm and 150 mm, respectively. The total tightening force exerted by four posts was 150 tons.

FIG. 7B shows that the deflections v of the crosshead and the bed can be reduced if the ends 9*a*', 9*c*' of the front and rear wall portions 9*a*, 9*c* of upright wall 9A are positioned at the inside of the line C—C. As a matter of fact, however, a bed warp (deflection of bed in the direction opposite to the deflection v) of 0.1 mm or so is considered permissible even in so-called precision press. From this point of view, it is considered that the influence of the deflection v is negligibly small as long as the overhanging h is maintained not smaller than zero, or at the plus (+) side.

The above-description taken in conjunction with FIGS. 6A, 6B and FIGS. 7A, 7B was made with specific reference to the upright wall 9A positioned at the right side of the press as viewed in FIGS. 6A and 7A. It is herein to be noted that, in the above-described test, the left upright wall 9B having the symmetrical configuration with the right upright wall 9A was used, and the structural or positional relationship between the left upright wall 9B and the associated left posts was made identical with that between the right upright wall 9A and the associated right posts.

As will be understood from the foregoing description, the lateral rigidity of the frame structure is increased to a sufficiently high level and the deflections of the crosshead and the bed at the center of the press caused by the tightening of the nuts 4 become negligibly small if the overhanging h is selected not smaller than zero.

In the first embodiment shown in FIGS. 5A and 5B, the front and rear wall portions 9*a*, 9*c* of the upright wall 9A terminate in ends 9*a*', 9*c*' which are projected to the left beyond the line C—C by an amount somewhat greater than the radius of the post. Similar configuration and positional relationship to the associated posts are adopted also in the left upright wall 9B. The frame structure of this embodiment, therefore, exhibits a considerably high rigidity. In addition, since the front and rear wall portions of both upright walls 9A, 9B completely cover the associated posts, the posts are not exposed to the exterior spaces at the front and rear sides of the press. This disadvantageous also from the view point of protection of the posts.

The test result shown in FIG. 6B is directed to only the front and rear wall portions of the respective upright walls. However, it is to be understood that the same result will be obtained to the side wall portions of the upright walls.

Namely, referring to FIG. 5B, it is possible to eliminate the intermediate portion of the upright wall 9A positioned between two right posts 3. In other words, it is possible to constitute the upright wall 9A with two separate members: a first member having a L-shaped cross-section surrounding the upper right post and a second member having a L-shaped cross-section and surrounding the lower right post. In such case, the side wall portion of the first member has to extend to the line E—E (FIG. 5B) interconnecting the centers of the right and left upper posts, at the shortest. Similarly, the side wall portion of the second member has to extend at least to the line F—F. When the right upright wall is composed of two separate members as described above, the left upright wall 9B also is composed of two separate members.

In order to facilitate the assembling of the press while preserving the high precision of the same, it is preferred to construct each upright wall with a single or integral member as shown in FIGS, 5A, 5B, rather than constructing the same with two separate members.

From the foregoing consideration, it is derived that, according to the invention, it is an essential requisite that the upright walls surround or cover at least that portion 3*a* of the peripheral surface of each post 3 which, as viewed in the cross-section of the press, is positioned between two lines obtained by extending two adjacent sides of a rectangle D (See FIG. 5B) which is formed by connecting the centers of four upstanding posts.

As will be fully understood from the above description, the fluid-operated press of the first embodiment has a slider 6 which slidably engages the posts 3 through the respective slide bushes 7 so as to be slidable along the posts 3 and, at the same time, has the frame structure of a high rigidity. The press thus constructed offers the following advantages.

(1) Since the guide for the sliding movement of the slider is constituted by the posts 3, the centering of the dies can be made easily and precisely making use of the posts as the reference.

(2) Since the frame structure exhibits a high lateral rigidity, the undesirable displacement or distortion between the bed and the slider is avoided and a high precision of positional relationship between these two members can be maintained during the press work.

(3) Because of the high precision of the positional relationship, undesirable biting between the posts 3 and the slide bushes 7 is eliminated. This permits the use of quenched or hardened posts 3 in combination with the slide bushes made of quenched or hardened steel. This combination brings about an improved durability as compared with the conventional structure which incorporates slide bushes made of soft material such as gun metal to avoid the biting.

(4) Since the sliding surfaces are constituted by mutually fitting cylindrical surfaces, i.e. the outer peripheral surface of each post and inner peripheral surface of the cooperating slide bush, a sufficiently large area of sliding surfaces is obtainable even with reduced axial lengths of the slide bushes. Thus, it is possible to reduce the dead space between the crosshead 1 and the bed 2.

(5) The production cost is reduced partly because the number of parts is reduced and partly because the precision of each part is obtained by a comparatively simple processing.

Figure 4:
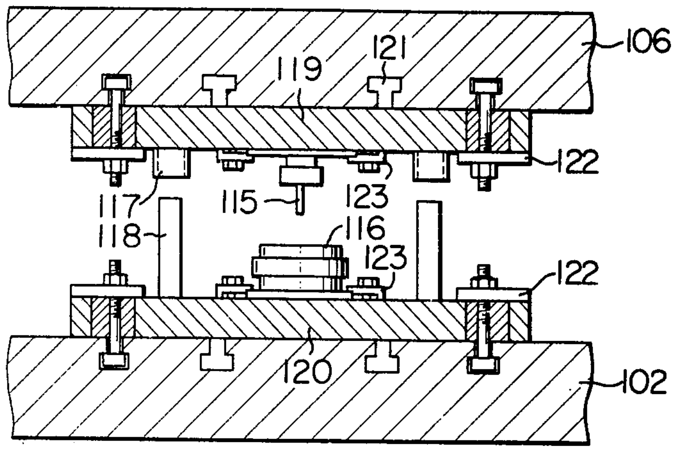
FIG. 4 PRIOR ART
FIG. 4 illustrates how mold parts are mounted in the conventional fluid-operated press.
Figure 8:
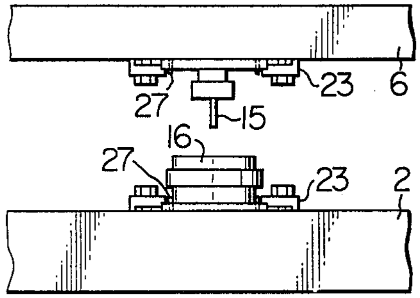
FIG. 8 fragmentally shows, by way of example, how mold parts are mounted in the fluid-operated press of the invention.

The fluid-operated press of the first embodiment does not necessitate the use of the die set as shown in FIG. 4 during the press work, because a sufficiently high precision of positional relationship is maintained between the bed and the slider. Namely, as shown in FIG. 8, the mold parts or dies 15, 16 can be directly attached to the slider 6 and the bed 2 by means of the die clamps 23, making use of dowel pins 27 for determining the attaching positions of the dies to the slide and the bed, without using the die set. Therefore, the expensive die set is economically eliminated and, at the same time, a large entrance for working is obtained to facilitate the work.

Figure 9:
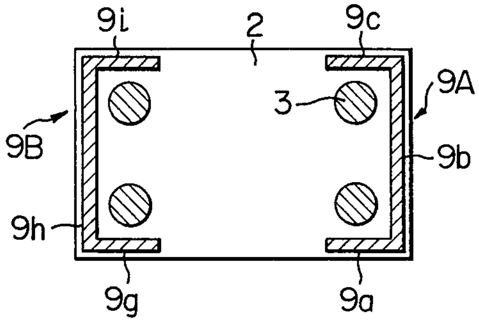
FIG. 9 is a sectional view similar to that of FIG. 5B showing a modification of the upright wall structure of the first embodiment.

FIG. 9 shows a modification of the upright wall structure of the first embodiment. In this modification, the upright wall 9A has, as viewed in cross-section, straight front and rear wall portions 9*a*, 9*c* extending inwardly of the press, i.e. to the left as viewed in FIG. 9, and a straight or flat side wall portion 9*b* interconnecting the front and rear wall portions. Similarly, the upright wall 9B is constituted by straight front and rear wall portions 9*g*, 9*i* and a straight or flat side wall portion 9*h*. In this modification, the deflections v caused by the tightening of the nuts 4, which has been described in connection with FIGS. 7A, 7B, are slightly increased as compared with the structure shown in FIGS. 5A, 5B. It is, however, possible to reduce the deflections to a negligibly small level by suitably selecting the second moment of area of each of the crosshead and the bed.

Figure 10:
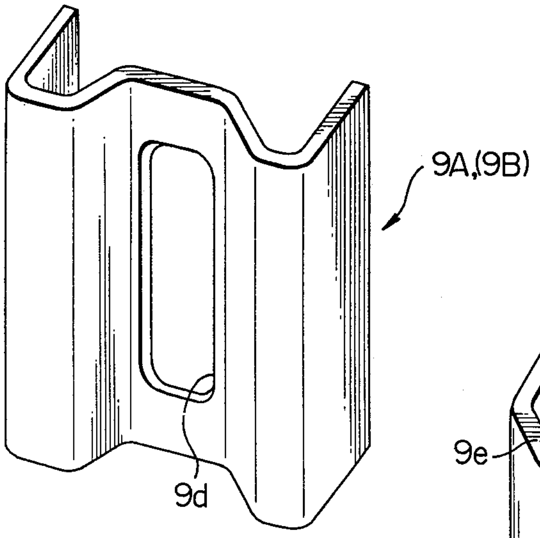
FIG. 10 is a perspective view of another modification of the upright wall structure of the first embodiment.

FIG. 10 shows another modification of each upright wall 9A, 9B of the first embodiment shown in FIGS. 5A, 5B. This modification has an window 9*d* formed in each upright wall at the breadthwise center of the latter and extending in the longitudinal direction of the same. Other structures of this another modification are substantially similar to those of the first embodiment shown in FIGS. 5A and 5B. This window 9*d* is formed to make the inside of the press accessible and to facilitate the work. The efficiency of the work is improved by the provision of this window 9*d*. No substantial reduction of the rigidity of the press is caused by the provision of such window. The window 9*d* may be formed only in one of the upright wall 9A or 9B.

Figure 11:
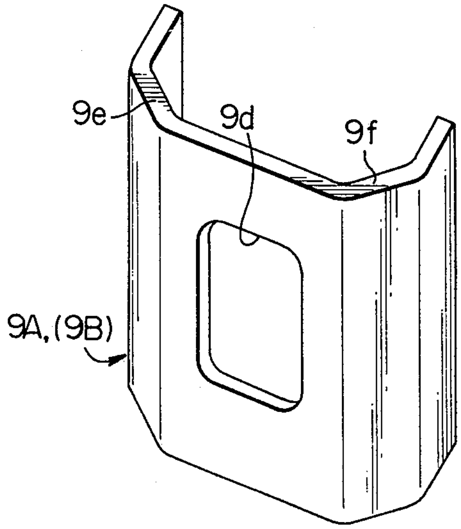
FIG. 11 is a perspective view of a further modification of the upright wall structure of the first embodiment.

FIG. 11 shows a further modification of the upright walls 9A, 9B of the first embodiment shown in FIGS. 5A and 5B. In this modification, a window 9*d* similar to that shown in FIG. 10 is formed in each of the upright walls. The straight front and rear wall portions of each upright wall is connected to the straight or flat side wall portion of the same through inclined walls 9*e*, 9*f*.

Figure 12:
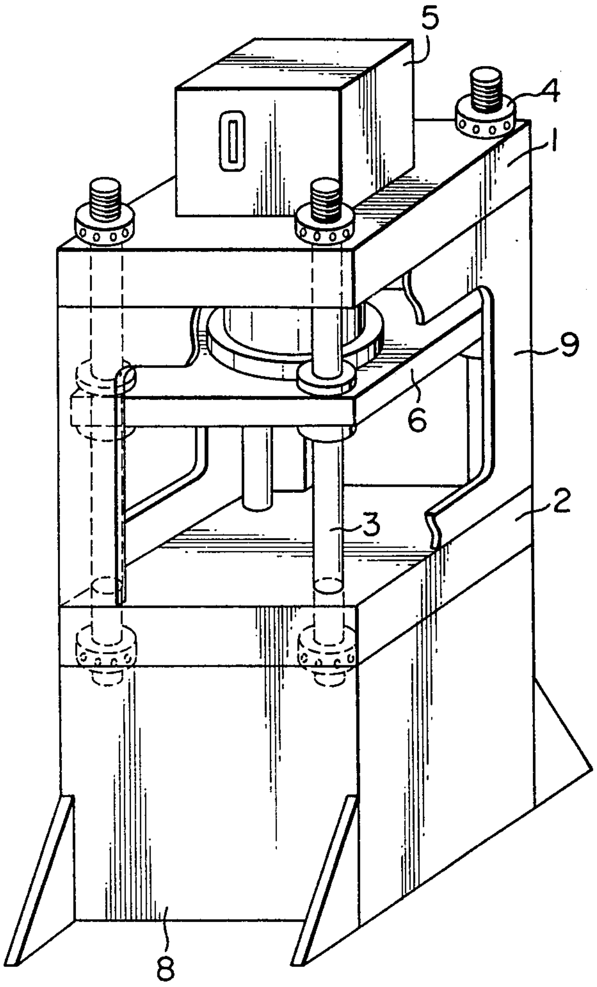
FIG. 12 is a partly cut-away perspective view of a fluid-operated press constructed in accordance with a second embodiment of the invention.
Figure 13:
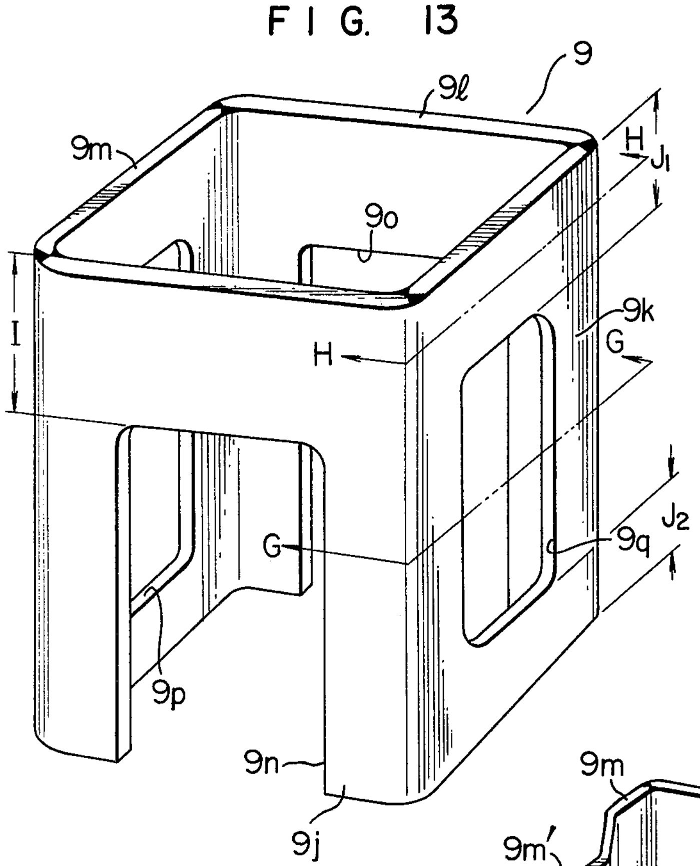
FIG. 13 is a perspective view of the upright wall structure of the second embodiment.

FIGS. 12 and 13 show a fluid-operated press constructed in accordance with a second embodiment of the invention. This second embodiment incorporates a box-like upright wall structure 9 opened at its top and bottom and surrounding the outside of four upstanding posts 3. Large entrance openings 9*n* and 9*o* are formed in the front and rear wall portions 9*j*, 9*l* of the upright wall structure, for permitting to carry the mold parts or dies, workpiece and the like dies into and out of the press. In addition, windows 9*p*, 9*q* similar to the windows 9*d* shown in FIGS. 10, 11 are formed in the left and right side wall portions 9*m* and 9*k*, respectively. Other structures of this second embodiment are substantially identical to those of the first embodiment.

The front and rear wall portions 9*j*, 9*l* and the left and right side wall portions 9*m*, 9*k* are brought together and welded to each other. In assembling, the upright structure is beforehand welded and unitarized at a high precision. Then, the upright wall structure as a unit is placed in the fluid-operated press precisely. Thus, the assembling is considerably facilitated and is made at an enhanced precision.

It is to be noted that the structural and positional relationship between the upright walls 9A, 9B and the adjacent posts 3, which has been described hereinbefore with reference to FIGS. 5A to 7B, has to be satisfied at any vertical or axial position of the upright wall structure. This is true also in the second embodiment shown in FIGS. 12 and 13. For instance, referring to FIG. 13, the area of the cross-section G—G of the portion of the upright wall structure where the openings 9*n*, 9*o* and the windows 9*p*, 9*q* are formed is fairly small as compared with a cross-section H—H at an upper level where no openings and windows are formed. In this case, it is necessary that the relationship between the upright walls and the posts as described with reference to FIGS. 5A to 7B (for example, the overhanging (h) of the upright wall structure with respect to the line C—C) is satisfied even at the cross-section G—G of smaller area.

It is preferable that the longitudinal length (I) of the upper parts of the wall portions 9*j* and 9*l* where openings 9*n* and 9*o* are not formed is more than 20% of the entire longitudinal length of the wall portions 9*j* and 9*l*, and that the longitudinal length ($J_1$ plus $J_2$) of the wall portions 9*m* and 9*k* where windows 9*p* and 9*q* are not formed is more than 20% of the entire longitudinal length of the wall portions 9*m* and 9*k*. More preferably, the lengths (I) and ($J_1$ plus $J_2$) are about 30% of the entire longitudinal lengths of the corresponding wall portions.

Figure 14:
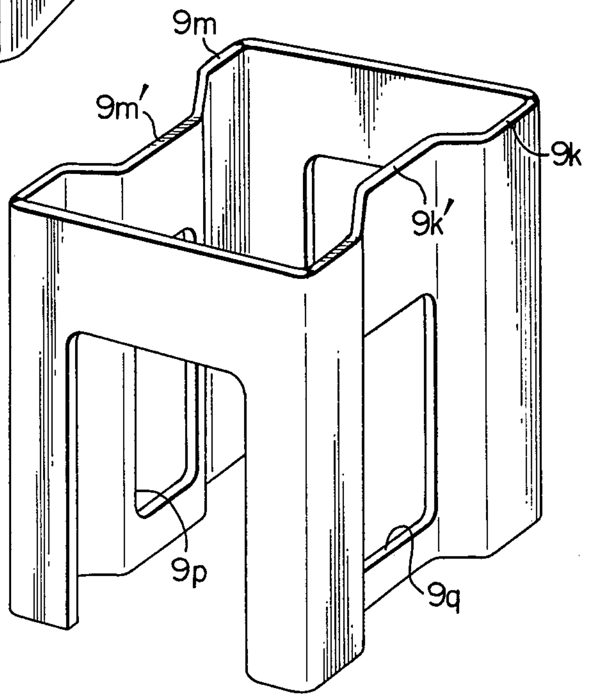
FIG. 14 is a perspective view of a modification of the upright wall structure of the second embodiment.

FIG. 14 shows a modification of the upright wall structure shown in FIGS. 12 and 13. This modification has left and right side wall portions 9*m* and 9*k* of a different form those shown in FIG. 13. More particularly, the left and right side wall portions 9*m* and 9*k* have at their widthwise intermediate or central portions inward projections 9*m'* and 9*k'* which are effective to enhance rigidity of the frame structure of the press. In these inward projections 9*m'* and 9*k'* are formed respective windows 9*p* and 9*q*. Other structures than specifically mentioned above are substantially similar to those of the upright wall structure shown in FIGS. 12 and 13.

As will be understood from the foregoing description, there is provided in accordance with the invention a less expensive fluid-operated press capable of effecting a highly precise press word and most suitably used in plastic working such as cold forging, press fitting and assembling.

What is claimed is:

1. A fluid-operated press comprising:
   - a crosshead,
   - a bed,
   - four upstanding posts extending between said crosshead and said bead,
   - said posts being of a rectangular arrangement with an axis of each post extending vertically through each corner portion of a rectangular plane,
   - a slider disposed between said crosshead and said bead and slidably fitted on said posts to be slidable along the latter, and
   - upright wall means positioned outside said slider and said posts and clamped between said crosshead and said bed,
   - said upright wall means including a wall portion surrounding at least that portion of the peripheral surface of each of said posts which, as viewed in cross-section of said press through any vertical position of said upright wall means, is positioned between two lines obtained by extending two adjacent sides of a rectangle which is formed by connecting the center points of said posts.

2. A fluid-operated press as set forth in claim 1, wherein said upright wall means includes a first unitary upright wall surrounding a first pair of said posts located near one lateral side of said press and a second unitary upright wall surrounding a second pair of said posts located near another lateral side of said press opposite to said one lateral side, each of said first and said second unitary upright walls having front, side and rear wall portions located on front, lateral and rear sides, respectively, of said press; and wherein, as viewed in the cross-section of said press through any vertical position of said upright wall means, said front and rear wall portions of said first unitary upright wall extend from said one lateral side toward said another lateral side of said press and are terminated at inner ends offset from the center points of said first pair of posts toward said another lateral side, while said front and rear wall portions of said second unitary upright wall extend from said another lateral side toward said one lateral side of said press and are terminated at inner ends offset from the center points of said second pair of posts toward said one lateral side.

3. A fluid-operated press as set forth in claim 2, wherein said side wall portion of said first unitary upright wall has a widthwise intermediate portion positioned between said first pair of posts and projecting toward the inside of said press, and said side wall portion of said second unitary upright wall has a widthwise intermediate portion positioned between said second pair of posts and projecting toward the inside of said press.

4. A fluid-operated press as set forth in claim 2, wherein each of said side wall portions of said first and said second unitary upright walls is constituted by a substantially flat wall interconnecting said front and rear walls of each of said first and second unitary upright walls.

5. A fluid-operated press as set forth in claim 2, 3 or 4, wherein said inner ends of said front and said rear wall portions of said first unitary upright wall are offset from the center points of said first pair of posts toward said another lateral side of said press by amounts slightly larger than the radiuses of said first pair of posts, while said inner ends of said front and rear wall portions of said second unitary upright wall are offset from the center points of said second pair of posts toward said one lateral side by amounts slightly larger than the radiuses of the latter posts.

6. A fluid-operated press as set forth in claim 2 or 3, wherein at least one of said side wall portions of said first and said second unitary upright walls is formed with windows for making the inside of the press accessible therethrough.

7. A fluid-operated press as set forth in claim 1, wherein said upright wall means includes an upright wall structure which is generally in the shape of a box opened to the upside and the underside, said upright wall structure having a front wall portion, a rear wall portion and side wall portions which are located on the front side, rear side and both lateral sides, respectively, of said press, and surrounding the outside of said four upstanding posts, at least one of said front and rear wall portions being formed with an opening for bringing therethrough members such as mold parts and workpiece into and out of the inside of said press.

8. A fluid-operated press as set forth in claim 7, wherein at least one of said side wall portions of said upright wall structure is formed with an opening for making the inside of the press accessible therethrough.

9. A fluid-operated press as set forth in claim 7 or 8, wherein each of said side wall portions of said upright wall structure has a widthwise intermediate portion which projects toward the inside of said press.

* * * * *

UNITED STATES PATENT AND TRADEMARK OFFICE
CERTIFICATE OF CORRECTION

PATENT NO. : 4,255,113

DATED : March 10, 1981

INVENTOR(S) : Takuzo KUROSAWA et al

It is certified that error appears in the above—identified patent and that said Letters Patent is hereby corrected as shown below:

Title Page

The designation of Assignee should include a second assignee as follows:

[73] Assignee: Hitachi, Ltd., Japan, and
Kawamura Co., Ltd., Japan

Signed and Sealed this

*Twenty-third* Day of *February 1982*

[SEAL]

*Attest:*

GERALD J. MOSSINGHOFF

*Attesting Officer* *Commissioner of Patents and Trademarks*